Patented Aug. 6, 1940

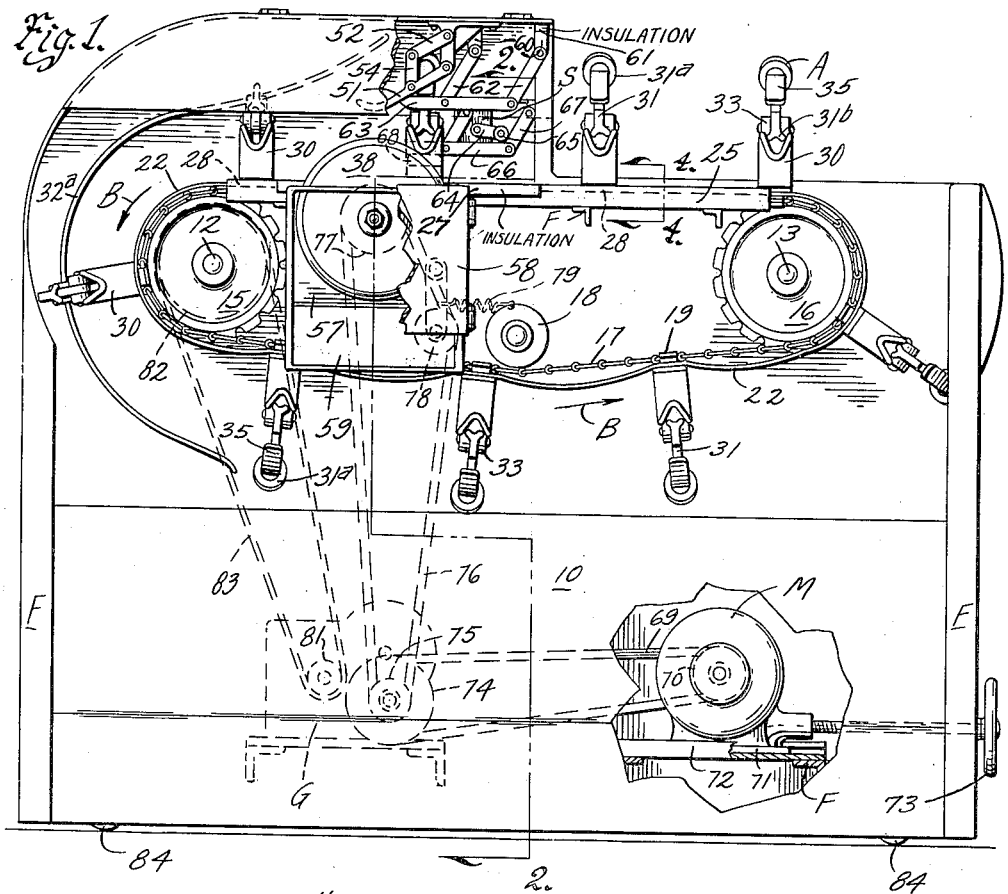

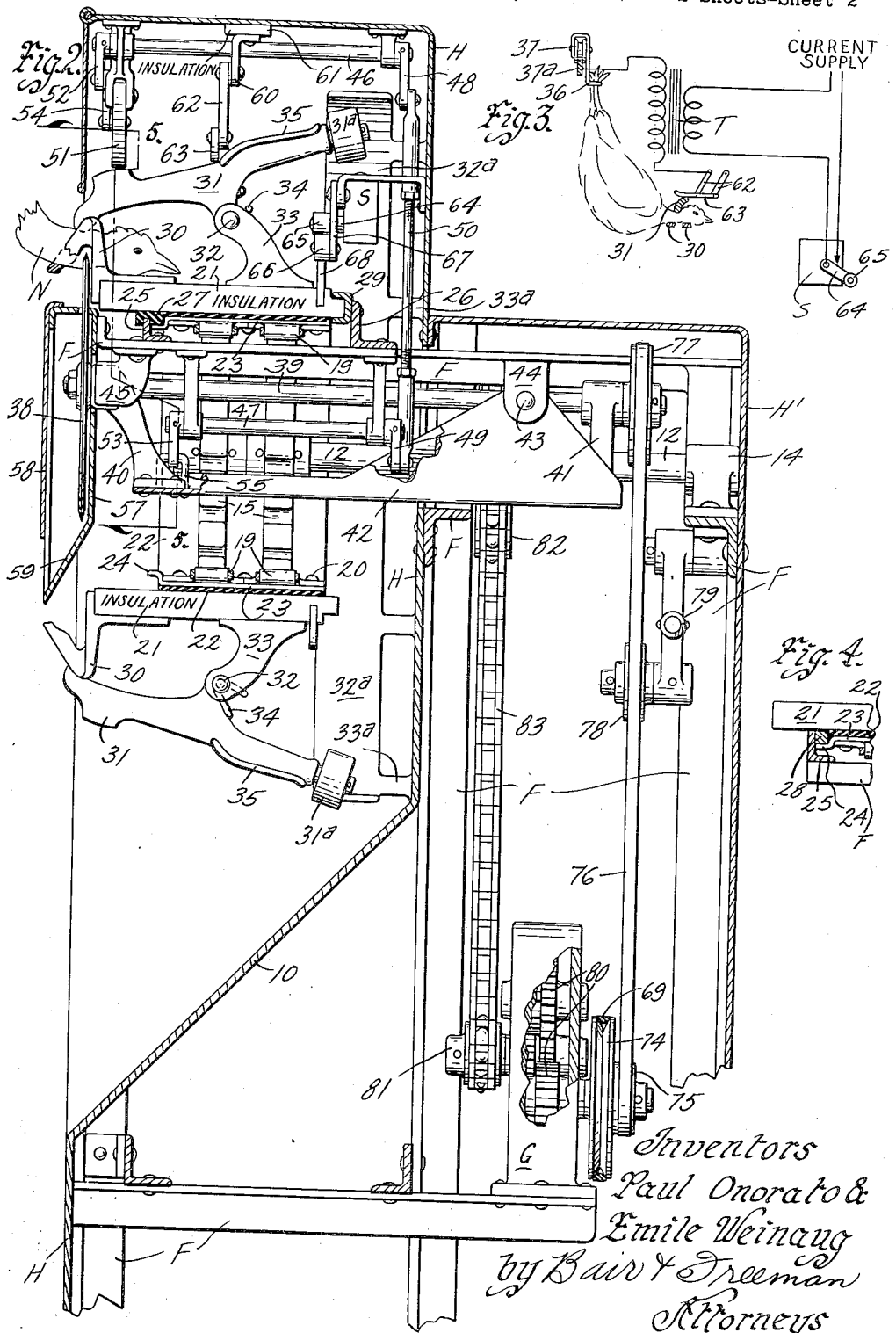

2,210,376

UNITED STATES PATENT OFFICE 2,210,376

POULTRY KILLING MACHINE

Paul Onorato, San Mateo, and Emile Weinaug, San Francisco, Calif.; said Weinaug assignor to Barker Poultry Equipment Company, Ottumwa, Iowa Application March 7, 1938, Serial No. 194,326

18 Claims. (Cl. 17—11)

Our present invention relates to a poultry shocking and bleeding machine.

An object of our present invention is to provide a poultry shocking and bleeding machine having many improved features of construction over the machines shown in our co-pending applications, Serial No. 38,918, filed September 3, 1935, and Serial No. 746,680, filed October 3, 1934, which have issued as Patents Nos. 2,152,082 and 2,152,083, respectively, dated March 28, 1939, the present application being a continuation in part of said co-pending applications.

More particularly it is our object to provide a machine in which a conveyor is utilized for the purpose of conveying the necks of fowls relative to a knife for cutting their throats so that they can be properly bled prior to being picked. Automatic switch mechanism is also provided in association with the neck holding means for energizing an electric circuit which charges the neck holding means with electricity of sufficient voltage to shock the fowls, either prior to cutting their throats or simultaneously therewith so that the shock will cause their muscles to relax and thus make easier the subsequent operation of picking their feathers.

A further object is to provide a machine of this character in which a conveyor has a plurality of spaced neck holding mechanisms which can be opened by the operator to receive the necks of the fowls after which they automatically close and automatically carry the necks of the fowls to positions where they are placed in an electric circuit and their throats cut, after which the mechanisms automatically open for releasing the necks of the fowls.

A further object is to provide the neck holding means of such character that it is variable to the different sizes of necks encountered during operation of the machine and operates due to such variation to adjust the position of the knife in accordance with the size of the fowls' necks whereby to most effectively sever the jugular veins of the fowls' throats by regulating the depth of cut in accordance with the size of each neck.

Still a further object is to provide track means for the conveyor and neck holding mechanism and a conveyor having certain characteristics of construction which minimize the possibility of transmission of the current for shocking the fowls from one neck holding mechanism to another and consequent shock to the operator of the machine when manually engaging one of the neck holding mechanisms to open it for reception of the fowl's neck therein.

Still another object is to provide a compact unitary machine for shocking and bleeding poultry and the like, the speed of operation of which may be varied within close limits so that the machine can operate in conjunction with a fowl carrying conveyor of the usual type found in poultry preparing establishments.

With these and other objects in view, our invention consists in the construction, arrangement and combination of the various parts of our machine, whereby the objects contemplated are attained, as hereinafter more fully set forth, pointed out in our claims and shown by way of illustration in the accompanying drawings, in which:

Figure 1 is a front elevation of our poultry shocking and bleeding machine, a portion of one of the cover doors being broken away to show switching and electrode charging mechanism and a portion of a drain apron in the machine being broken away to show the motor for operating the machine.

Figure 2 is an enlarged sectional view on the line 2—2 of Figure 1.

Figure 3 is an electro-diagrammatic view of the shocking mechanism of the machine.

Figure 4 is an enlarged sectional view on the line 4—4 of Figure 1 showing the cross section of the track for the conveyor at one point in the machine.

Figure 5 is a sectional view on the line 5—5 of Figure 2 illustrating the knife adjusting operation of the machine; and Figure 6 is a plan view of the motor and its mounting provided for operating the machine.

On the accompanying drawings we have used the reference character F to indicate frame members of the machine. The frame members F support a front housing H and a rear housing H'. The front housing H includes a drain apron 10 shown best in Figure 2. Within the housing H a drive shaft 12 and an idler shaft 13 are supported, suitable bearings being provided for the drive shaft 12, one of which is shown at 14 in Figure 2. The idler shaft 13 may be supported in any suitable stationary manner. Secured to the shaft 12 is a drive sprocket 15 while an idler sprocket 16 is rotatably mounted on the shaft 13. A conveyor chain 17 extends around the sprockets 15 and 16 and around an idler roller 18.

Spaced along the conveyor chain 17 are special links 19 which are secured as by screws or rivets 20 to blocks of insulation 21. Interposed between the special links 19 and the blocks 21 and thereby covering the conveyor chain 17 is a flexible belt 22 of rubber or other suitable insulating composition and guide bars 23 having guide fingers 24 at their forward ends.

As shown in Figures 2 and 4, a pair of stationary angle bars 25 and 26 are provided which constitute tracks for the conveyor. The angle bar 25 is notched and has secured to it a track section 27 of insulating material. Ahead of and behind the section 27, guide bars 28 are secured to the angle bar 25 (see Figure 4) and form continuations of the section 27. The guide fingers 24 of the bars 23 are adapted to coact with the section 27 and the bars 28 to prevent any undesirable rising of the forward ends of the insulating bars 21 relative to the track 25.

The angle bars 26 are provided with channel guides 29 to receive the inner ends of the bars 21 as shown in Figure 2. The insulating belt 22 spans the distance between the bars 27 and 28 and the channel guide 29.

Each bar 21 constitutes the base of a neck holding device for the fowls to be operated upon in the machine. For neck holding purposes, U-shaped receptors 30 are secured to the bars 21 and pivoted arms 31 have notched ends 31ᵇ adapted to cooperate with the receptors 30 to hold the necks of the fowls. In Figure 2 the neck of the fowl is indicated at N and is shown in section in Figure 5. The arms 31 are pivoted on pins 32 carried by brackets 33. The brackets 33 are mounted on the bars 21. Springs 34 are coiled about the pins 32 for the purpose of normally urging the arms 31 toward neck engaging position.

Each arm 31 is provided with a widened pad portion 35 to be engaged by the hand of an operator when the neck holding device is in the position indicated at A in Figure 1. In this manner the operator can open the neck holder and place the neck of the fowl therein. The fowl is preferably carried as shown diagrammatically in Figure 3 by a shackle 36 of a conveyor 37. These conveyors are standard equipment in poultry houses and form no part of our present invention.

The conveyor chain 17 of our machine travels in the direction of the arrows B shown in Figure 1. After the receptors 30 receive the necks of the fowls, they travel toward a throat cutting knife 38. The knife 38 is preferably of the rotary disk type and is supported on a revolving shaft 39. Bearings 40 and 41 are provided for the shaft 39 and these are supported on a channel shaped bracket 42. The bracket 42 is pivoted on a pin 43 carried by bearings 44 secured to the frame F of the machine. To prevent side motion of the outer or forward end of the shaft 39 the bearing 40 therefor is guided vertically between flanges 45 supported by the frame of the machine.

The pivotal connection at 43 is provided so that the height of the knife 38 and thereby the depth of cut thereof relative to the throat of the fowl may be changed to suit the size of the fowl's neck. This is illustrated in Figure 5, wherein solid lines indicate a relatively small neck and dotted lines a larger neck. The knife 38 is in a low position for cutting into the jugular vein J of the neck N, while it is desirably adjusted to a higher position, as shown by dotted lines, for properly cutting the jugular vein of the larger neck shown in dotted lines.

We accomplish automatic adjustment of the knife 38 by interconnecting linkage between the neck holding arm 31 and the bracket 42. This linkage includes an upper rock shaft 46, a lower rock shaft 47, and arms 48 and 49 on the respective shafts, which are connected by a turnbuckle link 50 for adjustment purposes. The linkage further includes an arm 51 to contact with each arm 31 as it passes the knife 38, an arm 52 connected to the shaft 46 and an arm 53 connected to the shaft 47. The arms 51 and 52 are connected together by a link 54, while the arm 53 is operatively connected to the bracket 42 by a yoke 55, which passes through a slot 56 of the arm 53. Accordingly it will be obvious that any upward motion imparted to the arm 51 by any of the arms 31 will rock the shafts 46 and 47 and thereby swing the bracket 42 about its pivot 43 for automatically raising the knife 38 in accordance with the size of the neck in that particular neck holder.

The knife 38 is preferably enclosed as much as possible in a casing 57. The casing 57 has an openable door 58 for gaining access to the knife for removing it and replacing it with a sharp one. The casing 57 has a bottom 59 which is sloping for the purpose of draining blood away from the knife and toward the front of the machine.

For shocking the fowl, we provide a transformer T (see Figure 3) which steps the commercial 110 volt alternating current up to the necessary voltage (5000 volts for example) for effectively relaxing the muscles of the fowl. One side of the secondary of the transformer is connected to the track 37a of the conveyor 37, while the other side of the secondary is connected to each of the arms 31 as they pass adjacent the knife 38 in the following described manner: A pair of brackets 60 depend from the top of the housing H and are insulated therefrom by being mounted on blocks 61. The brackets 60 carry links 62, which in turn carry a contact bar 63. The contact bar 63 is adapted to contact with each arm 31 successively as the arms pass under the bar. Referring to Figure 1, an arm is under the bar, and as soon as the arm passes, the bar will drop by gravity, causing the links 62 to swing to a vertical position. This permits the next arm 31 to engage the bar and raise it, after which the bar will remain in contact with the arm due to gravity.

It is undesirable to have the transformer T energized continuously, both for the purpose of economically operating the machine and minimizing the possibility of shocks to the operator. This is accomplished by providing a switch S in circuit with the primary of the transformer which is normally in open position and automatically closed by the neck holding devices as they pass the knife 38. For this purpose the switch S is provided with an actuating arm 64 carrying a roller 65. The roller 65 is engaged by a bar 66 supported by links 67. Due to gravity, the bar 66 would normally assume a position with the links 67 vertical instead of at an angle, as shown in Figure 1. Each neck engaging mechanism is provided with a projecting blade 68 adapted to contact with the bar 66 for swinging the links 67 to the position shown in Figure 1, thus raising the switch arm 64 to close the circuit. In this manner the electrodes for imparting a shock to the fowl are energized only when the neck of the fowl is adjacent the knife 38. Preferably the shock is imparted just prior to cutting of the throat.

Our switching mechanism provides periods of deenergization of the transformer during which the operator may open the neck engaging arms 31 without any possibility of being shocked. To eliminate the possibility of shock in the event the operator opens one neck holding mechanism while the transformer is energizing another one, the belt 22 has been provided and likewise the insulating section 27 of the track has been provided. The section 27 avoids the possibility of transmission of electricity along a film of moisture on the block 21 and then along the conveyor track, from the energized neck engaging mechanism to the next one, normally not energized. To automatically open the neck holders after the shocking and throat cutting operation so that the necks may be released, we provide a cam track 32a. It cooperates with rollers 31a on the arms 31 and is supported by extensions 33a on the back wall of the housing H.

For driving the conveyor chain 17 and the rotary knife 38, we provide an electric motor M. The motor M is belted by a belt 69 to a gear reducer G. A Reeves type pulley 70 is provided on the motor M whereby the speed of the gear reducer may be adjusted between close limits by adjusting the position of the motor M. For this purpose the motor M has a base 71 slidably mounted in guideways 72 and its position is controlled by a hand-wheel 73. On the gear reducer is a pulley 74 with which the belt 69 coacts. A pulley 75 is connected with the pulley 74 and belted by a belt 76 to a pulley 77. The pulley 77 is mounted on the knife shaft 39.

An idler pulley 78 is provided for the belt 76 and is retained against the belt by a spring 79. The idler 78 thus takes up any looseness in the belt resulting from raising of the knife 38 and consequent lowering of the pulley 77.

Within the gear reducer G suitable step down gearing mechanism 80 is provided which terminates in a sprocket 81. The sprocket 81 drives a sprocket 82 through the medium of a chain 83. The handwheel 73 may be adjusted for timing the conveyor chain 17 to the speed of the conveyor 37 available in the poultry house.

Our machine is preferably mounted on casters 84 whereby it may be wheeled alongside of any conveyor in the poultry house, and, where the conveyors travel at different speeds, it is obvious that it is desirable to readjust our poultry shocking and bleeding machine so that its conveyor travels in registry with the shackle conveyor. After the necks of the fowls have been cut, they are automatically released from our machine.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. In a poultry shocking and bleeding machine, a conveyor, a plurality of means on said conveyor for securing the necks of fowls thereto in spaced relation, a knife adjacent to the path of travel of said means to cut the throats of the fowls to permit bleeding thereof, each of said means constituting an electrode for contact with the neck of a fowl, a complementary electrode arranged to contact with another part of the fowl and switch mechanism actuated by the conveyor for establishing a current between said electrodes through the fowl prior to cutting the throat of the fowl.

2. In a poultry shocking and bleeding machine, a conveyor, a plurality of means on said conveyor for securing the necks of fowls thereto in spaced relation, a knife adjacent to the path of travel of said means to cut the throats of the fowls to permit bleeding thereof, each of said means constituting an electrode for contact with the neck of a fowl, a complementary electrode in contact with another part of the fowl and means for charging said electrodes whereby the fowl is shocked substantially simultaneously with the cutting of its throat.

3. In a poultry shocking and bleeding machine, a conveyor, a plurality of means on said conveyor for securing the necks of fowls thereto in spaced relation, a knife adjacent to the path of travel of said means to cut the throats of the fowls to permit bleeding thereof, each of said means being variable in size to accommodate different sizes of necks, said knife being movable to vary the depth of the cut in the throats of the fowls, and an operative connection between said respective neck securing means and said knife to move the knife to vary the position of the knife in response to different positions of the means and thereby vary the depth of cut in accordance with the size of the neck.

4. In a machine of the character disclosed, a conveyor, spaced means on said conveyor for securing the necks of fowls thereto, each of said spaced means constituting an electrode in contact with the neck of a fowl, a complementary electrode for engaging another part of the fowl, means for providing electric current for charging said electrodes for shocking the fowls and a cover of insulating material on said conveyor extending between the spaced means thereon to prevent transmission of the electric current from one means to the next during operation of the conveyor.

5. In a machine of the character disclosed, a conveyor, spaced means on said conveyor for securing the necks of fowls thereto, each of said spaced means constituting an electrode in contact with the neck of a fowl, a complementary electrode for engaging another part of the fowl, means for providing electric current for charging said electrodes for shocking the fowls, a cover of insulating material on said conveyor extending between the spaced means thereon to prevent transmission of the electric current from one of said spaced means to the next during operation of the conveyor, a track for said spaced means and an insulated section in said track to prevent transmission of current from one means to the next along the track, said means being successively energized for the purpose of shocking the fowls and such energization of any of said means occurring only while the means is in register with the insulated section of the track.

6. In a machine of the character disclosed, a conveyor, spaced means on said conveyor for securing the necks of fowls thereto, each of said spaced means constituting an electrode in contact with one of the fowls, a complementary electrode for engaging another part of the fowl, means for providing electric current for charging said electrodes for shocking the fowls, a track for said spaced means and an insulated section in said track to prevent transmission of the electric current from one of said spaced means to the next along the track, said electrodes being energized for the purpose of shocking the fowls and such energization of any of said spaced means occurring only while the spaced means is in register with the insulated section of the track.

7. In a machine of the character disclosed, a conveyor, spaced means on said conveyor for securing the necks of fowls thereto, each of said spaced means constituting an electrode in contact with each of the fowls, a complementary electrode for engaging another part of the fowl, means for providing electric current for bridging the electrodes and passing through a fowl between them at one point in the travel of the first-named electrodes for shocking the fowl, a track for said spaced means and an insulated section in said track to prevent transmission of the electric current from one of said spaced means to the next along the track when the spaced means registers with said insulated section.

8. In a poultry bleeding machine, a conveyor, means on said conveyor for securing the necks of fowls thereto in spaced relation, a knife adjacent to the path of travel of said means to cut the throats of the fowls to permit bleeding thereof, said knife being movable to vary the depth of the cut in the throats of the fowls, and means to move the knife to vary the position of the knife and thereby vary the depth of cut in response to the size of a neck held in said securing means.

9. In a machine of the character disclosed, a conveyor chain, spaced means on said conveyor chain for securing the necks of fowls thereto, each of said spaced means being insulated from said chain and constituting an electrode in contact with the neck of a fowl, a complementary electrode for engaging another part of the fowl, means for providing electric current for bridging said electrodes for shocking the fowls and a cover of insulating material on said conveyor chain extending between the spaced means thereon to prevent transmission of the electric current from one means to the next during travel of the conveyor chain.

10. In a poultry bleeding machine, means for securing the neck of a fowl, a knife to cut the throat of the fowl to permit bleeding thereof, said securing means and said knife being relatively movable and said means being variable in size to accommodate different sizes of necks, said knife being variable as to depth of cut in the throat of a fowl in the securing means, and means to move the knife to vary the position thereof in response to different sizes of necks in the securing means.

11. In a poultry bleeding machine, means for securing the neck of a fowl, a knife to cut the throat of the fowl to permit bleeding thereof, said securing means and said knife being relatively movable, and said means being variable in size to accommodate different sizes of necks, said knife being movable to vary the depth of cut in the throat of the fowl and an operative connection between said neck and said knife to move the knife to thereby vary the position of the knife in response to different positions of the means.

12. In a machine of the character disclosed, a conveyor, spaced insulators thereon, means on each of said insulators for securing the necks of fowls thereto, each of said securing means constituting an electrode in contact with the neck of a fowl, a complementary electrode for engaging another part of the fowl, means for providing electric current for charging said electrodes for shocking the fowls and a cover of insulating material for said conveyor extending between the spaced insulators thereon to prevent transmission of the electric current from one securing means to the next during travel of the conveyor.

13. In a poultry shocking and bleeding machine, a conveyor, self-closing, manually operable means on said conveyor for securing the necks of fowls thereto in spaced relation, a knife adjacent to the path of travel of said means to cut the throats of the fowls to permit bleeding thereof, each of said means constituting an electrode in contact with the neck of a fowl, a complementary electrode in contact with another portion of the fowl, means for establishing a circuit across said electrodes and through a fowl between them prior to cutting the throats of the fowl and a cam engaged by each of said means to open them and release the necks of the fowl therefrom.

14. In a poultry shocking and bleeding machine, a conveyor, a plurality of means on said conveyor for securing the necks of fowls thereto in spaced relation, a knife to cut the throats of the fowls to permit bleeding thereof, each of said securing means constituting an electrode in contact with the neck of a fowl, a complementary electrode in contact with another portion of the fowl comprising a shackle supporting the fowl by its legs and means for charging said electrodes whereby the fowls are shocked substantially simultaneously with the cutting of their throats.

15. In a poultry shocking and bleeding machine, means for securing the neck of a fowl therein, a knife to cut the throat of the fowl to permit bleeding thereof, said means constituting an electrode in contact with the neck of the fowl, a complementary electrode in contact with another part of the fowl and means for charging said electrodes whereby the fowl is shocked substantially simultaneously with the cutting of its throat.

16. In a poultry shocking and bleeding machine, a conveyor, a plurality of means on said conveyor for securing the fowls thereto in spaced relation, means to cut the throats of the fowls to permit bleeding thereof, each of said securing means constituting an electrode in contact with one portion of a fowl, a suspension conveyor for the fowls, said suspension conveyor having supporting shackles, each of which constitutes a complementary electrode in contact with another portion of a fowl, and switch mechanism actuated by the first conveyor for establishing a current across said electrodes and through the fowl prior to cutting the throats of the fowls.

17. In a poultry shocking and bleeding machine, a conveyor, a plurality of manually operable means on said conveyor for securing the necks of fowls thereto in spaced relation, means to cut the throats of the fowls to permit bleeding thereof, each of said securing means constituting an electrode in contact with the neck of a fowl, a complementary electrode in contact with another part of a fowl, switch mechanism actuated by the conveyor for establishing a current across said electrodes and through the fowl prior to cutting the throat of each fowl and means preventing the transmission of the electric current for shocking purposes from one securing means, along said conveyor to the next securing means when it is being manually operated.

18. In a poultry shocking and bleeding machine, a conveyor, means on said conveyor for securing the necks of fowls thereto in spaced relation, means to cut the throats of the fowls to permit bleeding thereof and means for varying the depth of cut in the fowl's throat in accordance with the size of the neck.

PAUL ONORATO.
EMILE WEINAUG.